March 4, 1952 P. J. McGAULEY 2,588,265
ISOLATION OF NICKEL SULFIDE
Filed Nov. 15, 1949
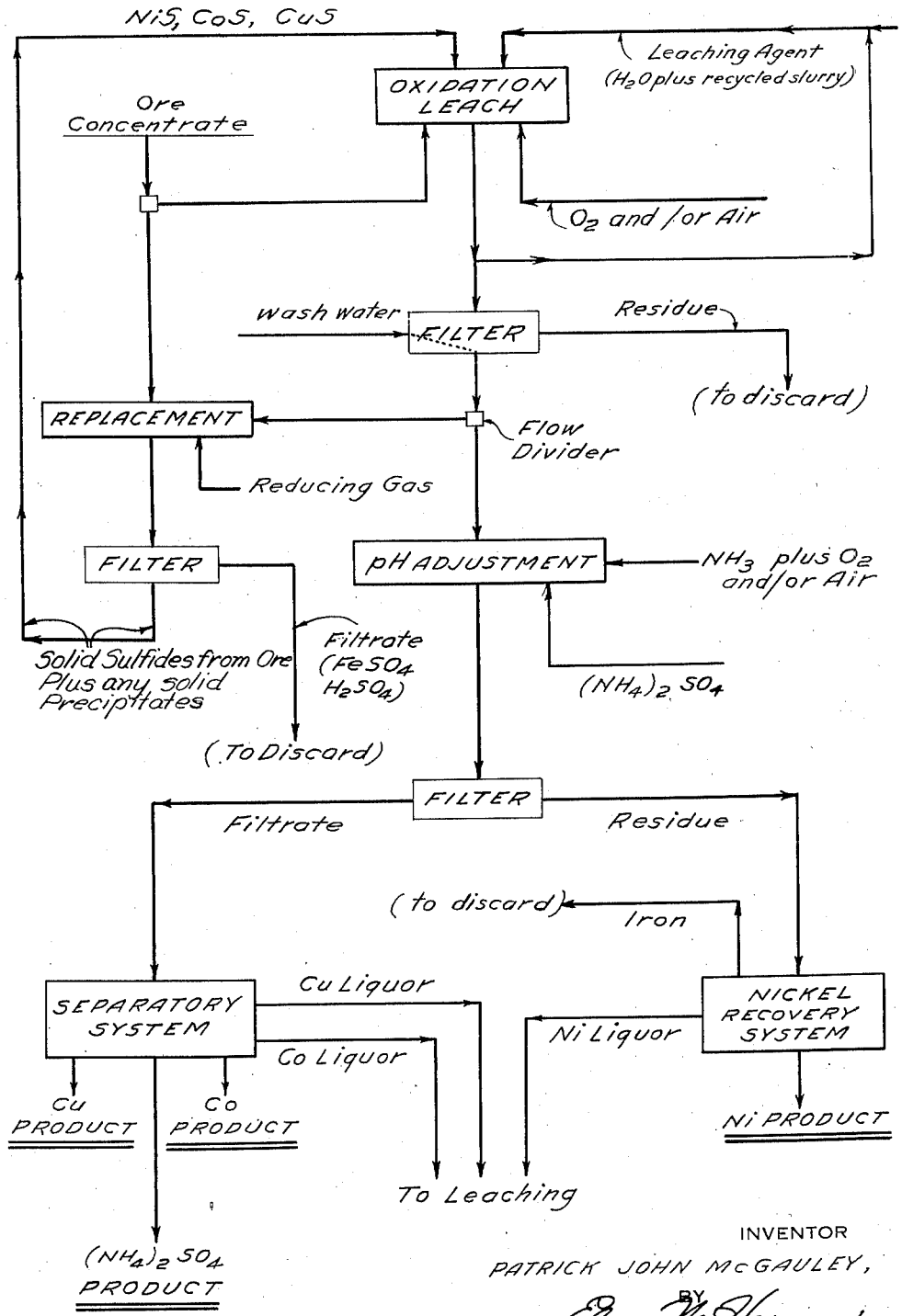
INVENTOR
PATRICK JOHN McGAULEY,
BY
Elmer W. Harmon
ATTORNEY Patented Mar. 4, 1952

2,588,265

UNITED STATES PATENT OFFICE 2,588,265

ISOLATION OF NICKEL SULFIDE

Patrick J. McGauley, Glen Cove, N. Y., assignor to Chemical Construction Corporation, New York, N. Y., a corporation of Delaware Application November 15, 1949, Serial No. 127,451

5 Claims. (Cl. 75—119)

This invention is concerned with the production of non-ferrous metals. It is concerned particularly with a leaching treatment for ore concentrates containing sulfide minerals of such metals as nickel, cobalt, copper and the like, and having present therein iron-bearing minerals as diluents and acid-insoluble gangue.

Still more specifically, the present process deals with a novel procedure which simplifies the leaching operation on nickel ores. Further, it not only enables effective leaching to be carried out but also the nickel mineral content to be separated from the remaining non-ferrous metals, both effects being obtained in a more economical operation.

The present invention constitutes a continuation-in-part of my copending application for United States Letters Patent, Serial No. 97,227, filed July 4, 1949.

With the increasing use and demand for non-ferrous metals, the art has become increasingly concerned with the development of simpler and more economical methods for their recovery from minerals mixtures thereof. Periodically, various proposals have been advanced for the separation of non-ferrous metals from their ores by purely chemical treatment, i. e., those which do not involve electrochemical precipitation.

In general, such proposed processes may be roughly divided into two parts. In the first part, the ore is treated by some form of "solutions operations," i. e., leaching and its accompanying steps to convert the metal values thereof to a solution of soluble salts. In the second, the salts solution is treated to recover the metal values equivalents. There is always the concomitant problem of separating the metals, each from the other. In some cases, this is considered as part of the leaching problem; in others, with the metal recovery problem. It is actually with both that the present invention is concerned.

Although ores of nickel-bearing minerals are not uncommon, the presently-available, commercially-adaptable methods of isolating the nickel content of such ores when iron and additional non-ferrous metals are present, and the subsequent conversion of the nickel-bearing fraction to a commercially-acceptable metallic nickel product, are not wholly satisfactory. Not all of the known methods make adequate provision to solve the problems created by the presence of the iron. Not all such processes make adequate provision for the separation of nickel from other non-ferrous metals, i. e., such as the separation of nickel from copper and/or cobalt. In many cases, an otherwise acceptable procedure is not readily adaptable for commercial development because of excessive apparatus requirements, reagent consumption and the like, all of which factors result in relatively high cost of production.

It is, therefore, the principal object of the present invention to devise a method of separating metallic nickel from its ores, and also from accompanying non-ferrous metals which may be present in the same ores. Preferably, such a process should be generally applicable to common ores. It should not require electrical precipitation. It should not require excessively complicated process steps, unusual reagents, or excessive amounts of apparatus.

In general, the process requirements of the present invention have been met by combining a novel "solutions operations" procedure, which is a modified acid-leaching process, the acid being formed, in situ, with a novel method of isolating from the leach liquor a fraction containing substantially only nickel-bearing values. In the latter operation, a part of the leach liquor is treated as taught in my above-identified copending application. Also, in this operation, acid is removed from the system without the necessity for neutralizing it.

More specifically, in the solutions operations of this invention, a nickel-bearing ore is leached by adding fresh ore concentrate, and water, as necessary, to a recycled portion of acidic slurry obtained in a preceding cycle by oxidation leaching. The metal sulfides values in the feed concentrate are thus oxidized to dissolved sulfates. The dissolved sulfates are then separated from the residual acid-insoluble solids. The resultant liquor is quite high in sulfuric acid content, the latter being produced in the oxidation leaching step.

In my above-noted copending application, the entire leach liquor is eventually neutralized with ammonia. To do so resulted in a high rate of ammonia consumption and the production of large quantities of ammonium sulfate. Where ammonia is not readily available or there is no ready market for its sulfate, this may be undesirable. It is desirable, therefore, to be able to reduce the ammonium sulfate production. It is a particular feature of the present invention that this is accomplished by dividing the clarified leach liquor into two portions.

Only one portion of the leach liquor is neutralized with ammonia. Preferably, this is done in the presence of added ammonium sulfate.

Neutralization is carried sufficiently far to produce an insoluble nickel sulfate, ammonium sulfate double salt. The latter is precipitated and collected, leaving a nickel-free solution which is sent to a separatory system, in which metals such as copper, cobalt and the like, and ammonium sulfate, may be recovered.

The remaining portion of the clarified leach liquor is subjected to a procedure which constitutes a feature of the present process. It is subjected to a replacement or precipitation operation. This operation is carried out according to the principles disclosed in my copending joint application with E. S. Roberts and F. A. Schaufelberger for United States Letters Patent, Serial No. 127,452, filed of even date, for treatment of similar liquors for other purposes. According to the process teaching therein, this portion of clarified leach liquor is treated simultaneously with an added metal sulfide and with a reducing agent, preferably a gas. All the non-ferrous metals, in this way, are precipitated as their equivalent sulfides. These sulfides are then collected as by filtration or the like.

The iron content of this portion of the leach liquor thus passes from the system in the filtrate as ferrous sulfate. At the same time, any sulfuric acid content of the leach liquor which it is preferred not to neutralize with ammonia is drawn from the system in this filtrate. The precipitated sulfides from this operation are recycled to the oxidation-leaching step.

It is believed that the process of the present invention may be more readily understood by reference to the accompanying drawing. The latter constitutes a simplified flowsheet, showing the principal operational elements of the process. However, before discussion of the specific details of the process, in conjunction with the drawing, some generally-applicable considerations should be noted.

As mentioned above, nickel-bearing ores are seldom found in which nickel minerals are the sole, or even the predominant, metal-bearing constituent. Usually, nickel-bearing minerals occur as mixtures with gangue, with other non-ferrous metals, and with iron-bearing minerals. The total minerals values content is usually a small portion of the total ore, the balance being inert matter or gangue, usually silica or silicates. Therefore, while the process may be used on a whole ore, as mined, such a process would be undesirable, because of the necessity for handling the large bulk of gangue.

Accordingly, the ore is usually treated by some preliminary concentration operation, such as gravity separation and/or froth flotation or the like to eliminate the bulk of the acid insolubles. Such procedures form an art in themselves, with which the present invention is not concerned. In the instant case, it is assumed that such an operation has been carried out and that it is the resultant concentrate which is to be treated in accordance with the present process.

It should also be noted that, as brought out in my above-identified copending application, Serial No. 97,227, various leaching systems are known in the art. In some, an acid solution is used to leach the ores; in others, a basic solution, usually ammoniacal, is used. The acid leach liquors usually contain ferric sulfate, or some equivalent salt; whereas the ammoniacal leach liquors usually contain ammonium salts, such as ammonium carbonate, or complex metal ammonium ions. It is also there shown that, at a pH of about 4.6–8, in a concentrated solution of ammonium sulfate, a nickel sulfate, ammonium sulfate double salt is substantially insoluble and may be precipitated quantitatively, so far as the nickel content of the solution is concerned.

In using the process of my above-identified application, either acid or ammoniacal leaching could be used. When sulfuric acid is used as the leach liquor, it is neutralized with ammonia to form ammonium sulfate. If the amount so formed is not sufficient for a suitably concentrated solution, preformed ammonium sulfate salt is added to the solution. If an ammoniacal leach is used, the liquor is neutralized with sulfuric acid, again to form ammonium sulfate. While the process is thus extremely flexible in its applicability to different types of ores, it necessitates the use of large amounts of ammonia, either to neutralize acid or in the neutralization of large amounts of ammoniacal leach liquor with sulfuric acid. Where there is available sufficient ammonia, or there is a ready sale for ammonium sulfate, the process is excellent. However, so far as further use in the process is concerned, the ammonia which is steadily consumed is lost.

In accordance with the present invention, a modified leaching operation is used. It is applicable to many available, naturally-occurring sulfide ores. Even though not adaptable to as wide a variety of ores as is the process mentioned above, where it can be used, it has a definite advantage in a much smaller ammonia consumption. By adjusting the quantities of clarified leach liquor between the two treatments of this invention, the production of ammonium sulfate can be greatly reduced. It is a definite advantage of the present invention that, to a great extent, this is brought within the control of the operator. He can produce only the desired amount, in most cases.

These advantages of the present invention are obtained by the utilization of efficient oxidation during the leaching operation. The basic idea of leaching with concomitant oxidation is well known. Metal sulfides are thereby converted to soluble metal salts. These sulfates are taken up in solution by adding either acid or ammoniacal solution as the leach liquor with the ore feed. However, in the present invention, instead of adding acid or ammonia solution, the sulfates are taken up directly in water by adding water only as fluid with the ore feed.

Application of these general considerations to the process of the present invention is set forth and illustrated in the accompanying flowsheet. It will be seen that the first principal step is that designated as an oxidation-leach. As pointed out above, the principal operation in this step is the conversion of the sulfides to soluble sulfates. They are, then, essentially taken up as solutions in which the only acid present is that formed from the ore in oxidizing the sulfides present. Accordingly, the leaching of this invention is essentially a modification of sulfuric acid leaching as carried out in previous operations. During the leaching operation, sufficient acid, produced in the process, acts as the leaching acid. In starting operations, a certain amount of sulfuric acid may be added, if so desired, to speed up the starting. However, to do so is not essential. Subsequently, the overall process is self-sustaining in this respect. Accordingly, the flowsheet shows the addition of a leaching agent. This is, however, added as acid only at the outset and in most cases not necessarily then. Subsequently, it is water, plus an amount of recycled slurry, as shown. It is the acid content of this slurry that functions in the oxidation leaching step.

Use of various recirculation systems in leaching are substantially standard practice. Their principal purpose in the past has been to insure, by treatment and retreatment, the dissolution of a sufficiently high amount of a minerals values content of the ore being treated. In the present case, while only one operation has been shown under the designation oxidation-leaching, actually, a plurality of steps, in accordance with some standard leaching operation technique, is, of course, contemplated for use. In these steps, in the course of recirculating leach liquor, sufficient oxidized slurry is recycled to maintain the necessary degree of acidity for effective operation.

In general, the pH during these operations should be below about 3.0, in order to insure all the sulfates which go into solution remaining therein. In general, the acid content should not be allowed to exceed about 10-15% and preferably not over about 5-7%, in order to insure against having to neutralize too great a quantity of acid in subsequent operations. This can be controlled by dilution. In the course of the operation, there is no difficulty in producing sufficient acid to leach at the necessary pH of about 3.0 or less, nor is there usually any particular difficulty in preventing the acid content from exceeding the desired upper limit.

As the oxidizing agent for the leaching operation, the operator has considerable choice. Preferably oxygen is used, since this tends to speed up the reaction. However, in many cases, oxygen for the purpose is not readily available. Air may be used, which, except for the increased volume, is perfectly satisfactory. Oxygen-enriched air is also advantageous.

Oxidation should be carried out under conditions of increased temperature. Actually, there is no difficulty in this respect. The reaction is exothermic. It may even be necessary to bleed steam from the system, to prevent unnecessary or excessive increases in temperatures and pressure. Preferably, the reaction temperature should not go below about 275° F., since below this value, the reaction tends to be too slow. On the other hand, temperatures may be allowed to go as high as is either desirable or practicable, in the available apparatus. There is no particular advantage in going above about 500-600° F. Since temperatures above 750° F. place an excessive restriction on the ability of the apparatus to withstand the equivalent pressures, it is probably the maximum desirable temperature, even though it may be readily exceeded in a suitable vessel.

Some positive pressure is necessary, due to the use of gas as the oxidizing agent. In general, the pressure control is simply that which is produced by the increased temperature in the exothermic reaction. Sufficient pressure is generated in the reaction, due to the temperature rise and steam generation. It is controlled at that pressure which is equivalent to the operating temperature. Excess steam and gas is vented from the system.

Treating ore concentrate to the oxidation-leaching step is carried out, otherwise, in any conventional manner. The concentrate will usually be fairly small in particle size, normally having been beneficiated, as noted above, by froth flotation or the like. Preferably, but not necessarily, the ore concentrate is passed to the leaching system as a wet slurry.

As noted above, the operation indicated as oxidation leaching actually involves some multiple-step, recirculating system in accordance with standard usage. In this operation, in accordance with the present invention, only sufficient acid slurry is ordinarily returned to the initial step in the leaching operation to provide some initial acid to speed up the starting. A major portion of the oxidized slurry is drawn from the oxidation system for further treatment. It is filtered, the solids being collected and washed, as shown in the drawing. This is done to separate the solution of dissolved salts from the residual acid-insoluble gangue. The latter may, ordinarily, be passed to discard without loss.

In the process of the present invention, the solids-free leach liquor is divided into two parts. The first liquor fraction is passed on to that part of the system in which the nickel is separated from the remainder of the metals and subsequently is recovered per se. The remaining portion of leach liquor is treated by a precipitation or replacement reaction, as will be discussed below.

With respect to the line of flow in which metals are eventually recovered from the first fraction of pregnant leach liquor, the latter is sent to an operation which has been designated on the flowsheet as a pH adjustment. This operation actually accomplishes a plurality of functions.

First, the excess acid is neutralized. This is carried out in order that subsequent operations, which require pH's higher than the normal acidity of the leach liquor, can be carried out. At the same time, the neutralization, which is carried out with aqueous or gaseous ammonia, produces ammonium sulfate. The solution also usually is subjected to mild oxidation with oxygen, air, or oxygen-enriched air. This insures all the dissolved salts, the cations of which may have one of several valences, being in the most highly oxidized condition.

Neutralization is carried to the extent of producing a pH of from about 4.0, preferably from about 4.5, to just below about 6.8. In this range, nickel sulfate forms with ammonium sulfate a double salt which is quantitatively insoluble in a concentrated solution of ammonium sulfate. Ammonium sulfate is formed during neutralization. However, unlike the process of my above-mentioned application, Serial No. 97,227, all the acid formed or used during leaching is not neutralized in this step. Therefore, the salt formed may not be adequate in amount both to form the double salt and to form a sufficiently concentrated ammonium sulfate solution. For that reason, preformed ammonium sulfate may, and usually must, be added at this stage. Since ammonium sulfate is one of the products of the overall process, it is, of course, readily available for this purpose.

In crystallizing the nickel double salt, it should be noted that the copper and/or cobalt salts must be retained in solution. It may, therefore, be necessary in some cases to take precautions that the cobalt-nickel and copper-nickel ratios do not exceed the limitations at which, for the ammonium sulfate content of the liquor, the cobalt and copper may be retained in solution.

Assigning numerical limitations within which limits the conditions must be maintained is not readily done. At a pH above about 6.8 the $Ni^{++}$ ion becomes a nickel-ammonium complex such as the $Ni(NH_4)_x^{++}$ ion, where $x$ varies from about 2–6, depending upon the available ammonia. Below a pH of about 4.0, the double salt does not form. In the case of cobalt, the corresponding pH values are about 5.5 and 3.5 respectively. It is necessary, for the best results, that the double salt be precipitated under these conditions.

As to the amount of ammonium sulfate which should be in solution, the limits are obviously affected by the temperature. If about 25° C. is taken as illustrative, the nickel double salt is soluble to less than 1% by weight in a solution containing about 9–10% ammonium sulfate and is insoluble in solutions of more than about 20% ammonium sulfate. At these ammonium salt concentrations, the cobalt is soluble from about 6% down to about 1.5% respectively, and the copper salt from about 10% down to about 2%.

Obviously, the solubility of cobalt and copper decreases with increasing ammonium salt concentration. At the same illustrative temperature, cobalt double salt, for example, becomes insoluble at about 40% ammonium salt concentration, but copper remains soluble in appreciative amounts to about 50% ammonium salt concentration. Accordingly, it is desirable that the nickel double salt precipitation be carried out at ammonium salt concentration not much above the minimum at which nickel salt is insoluble. In this way, the maximum permissible copper and cobalt concentrations can be maintained. In some cases, the cobalt and/or copper to nickel ratios may be higher than the solubility curve will permit the cobalt and copper content to be wholly retained in solution, while the nickel is being precipitated. In such cases, the liquor is diluted with respect to the copper and/or cobalt content sufficiently to retain these metals in solution. Dilution will, ordinarily, be made by recycling barren liquor from which copper and/or cobalt has been removed in the separatory system. If necessary, an ammonium salt concentration adjustment can be made after dilution.

The operating conditions are, accordingly, maintained such that the nickel double salt is substantially quantitatively insoluble. The copper and cobalt salts remain in solution. Accordingly, as shown in the drawing, the solution then is filtered and washed. The presscake or residue, which comprises the double sulfate crystals, is sent to a nickel recovery system. The actual nickel recovery system per se forms no part of the present invention. A highly suitable circuit for the purpose is shown in the application for letters patent, Serial No. 97,227 of P. J. McGauley, which was noted above.

From the filter, the filtrate is sent to a treatment in an operation designated as a "separatory system." Like the nickel recovery circuit, the actual operation thereof forms no part of the present invention. In it, the copper and/or cobalt is recovered as is the ammonium sulfate. One excellent system for the purpose, which quantitatively collects the copper, the cobalt, and the ammonium sulfate, is shown in the copending application of P. J. McGauley, Serial No. 97,228, filed June 4, 1949.

A novel, and highly important, feature of the process of the present invention is the treatment of the remainder or second portion of the solids-free leach liquor. As a first step therein, it is passed to an operation which, in the flowsheet, is designated as a "replacement." Here it is treated to eliminate from the system not only iron from the ore, but any excess of $SO_4^{--}$ ions formed during the oxidation leaching. It is admixed with additional amounts of sulfides and a reducing agent, preferably a gas. It is necessary that the added sulfides contain at least one sulfide which is more soluble than the sulfides of any of the metal values which it is desired to separate from the pregnant leach liquor.

Of the commonly available materials, iron sulfides meet this requirement. They may be used per se, obtained as some high iron sulfide content pyritic iron ore. On the other hand, it is advantageous, wherever the iron sulfides content of the nickel ore is sufficiently high, to use additional quantities of the same ore concentrate being leached. Since this is the preferred operation, it is so shown in the flowsheet. At least a sufficient amount of ore concentrate to have an iron and sulfur content equivalent to that of the non-ferrous metal values in the leach liquor is necessary. If desirable, the iron sulfide content can be insured by adding iron sulfides per se to the ore concentrate. In the illustrative case, these non-ferrous metal values will comprise the cobalt, nickel and copper sulfates in the pregnant leach liquor. Since, as will be brought out, the solids residue after this operation are sent to the leaching operation, when using ore concentrate, an excess of iron sulfides does no harm and insures precipitation of all the metals values. In using iron sulfides per se, an excess should be avoided, so far as possible, consistent with complete precipitation.

The replacement should be carried out under controlled conditions. However, a considerable latitude is allowed therein. This reaction may be carried out in any suitable vessel, equipped to carry out chemical reactions under pressure. Like the oxidation reaction, this reaction, too, is preferably carried out under elevated temperatures. Below about 275° F., the reaction is too slow to be desirable. The upper temperature limit is usually in the range from 500–750° F. While higher temperatures may be used, there is no particular advantage in so doing. While the lower portion of the temperature range places the least restrictions on the apparatus, considerably longer periods are required. Because an oxidation leaching is used, there is no particular problem therein in leaching at the desired temperature. The sulfates solution coming to the replacement reaction is already hot. If additional heat is required during replacement, it is readily available from the steam which is bled from the leaching system, as noted above.

For the same reasons that elevated temperatures are preferred, apparatus equipped for agitation is also desirable. It is not essential to successful operation, however. In general, a replacement which can be carried out in 1½–2 hours at about 450° F. without effective agitation, can be carried out in about ½ hour at the same temperature if the pressure vessel is equipped for agitation of its contents.

An additional feature of the replacement treatment is the use of a reducing agent. If only a metal sulfide is used in the replacement, only the least soluble sulfides will be precipitated. This is, probably, due to the fact that sulfide ions liberated during the reactions are utilized in precipitating the least soluble sulfide before they reach a sufficiently high concentration, so that their product of concentration and the concentration of the hydrogen ions, divided by the concentration of un-ionized metal sulfides in solution, will not reach a value at which more soluble sulfides are readily precipitated.

The use of the reducing agent tends to prevent oxidation reactions, which also utilize sulfide ions and prevent the concentration of the latter from becoming as high as is desirable. It is not intended that the present invention be limited to this particular theory of operation, however. In any case, the use of the reducing agent is found to be particularly effective.

A number of different reducing reagents may be used. Preferably, it should be a gas. Any available gas for the purpose may be used. Carbon monoxide, sulfur dioxide and the like may be used, for example. Hydrogen, probably, is even better, as it is an excellent supplement to the hydrogen sulfide which is liberated during the replacement reactions. Additional hydrogen sulfide, although not usually available for the purpose, is highly desirable. Mixtures of carbon monoxide and hydrogen, as found in various industrial gases, are highly suitable for the purpose, and are usually the most economical and most readily utilized. Hydrocarbons, such as methane and ethane, may be used; however, their use alone is not recommended, because, in some cases, they appear to form complex ions with some of the metals. Their presence as part of an otherwise desirable and available gas mixture, does not appear to be harmful in this respect.

It should be noted that a replacement, rather than a reduction, operation to purposely precipitate metals is being carried out. Therefore, the actual reducing agent consumption is comparatively small. It is necessary only to maintain sufficient concentration to retard or reverse the tendency towards completion of oxidation reactions, such as

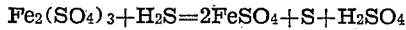

$$Fe_2(SO_4)_3 + H_2S = 2FeSO_4 + S + H_2SO_4$$

or the like, which occur during the replacement. Accordingly, substantially all of the precipitate will be in the form of sulfides of the metals, even though some reducing agents, if used alone, might tend to precipitate metals or other salts. In any case, the composition of the precipitate is irrelevant, because it is sent to the leaching operation and redissolved. For this reason, if desirable or necessary, other and usually less economical agents may be feasible. For example, methyl and ethyl alcohol may be used for the purpose. Formic acid, oxalic acid, and the like, formaldehyde in its various commercial forms, and as its sulfoxylates, serve the purpose. Ordinarily, as noted above, however, the use of gases will be found simpler and, usually, more desirable economically.

Treatment with the ore concentrate, or the iron sulfides, and reducing agent is continued until precipitation of non-ferrous metal sulfides is substantially complete. The latter are then removed from the slurry by filtration. As noted above, ore concentrate is the preferred material for added iron sulfides and may be used in excess. The latter should not be too great, to avoid overloading this filter. The solid sulfides, and unreacted sulfides or ore concentrate, if any, which constitute the presscake, are then sent to the oxidation-leaching step. These sulfides will be relatively free from iron. For each equivalent of sulfides precipitated, an equivalent of ore concentrate has been treated to add its non-ferrous metals to the system, but free from its iron content, which will be then in the filtrate. Recycling these sulfides builds up a much higher non-ferrous metals to iron ratio in the material being subjected to oxidation-leaching than would be possible with all the ore concentrate fed directly to the oxidation-leaching step. This is no small advantage of the present invention. The sulfides so added and recycled are oxidized directly to sulfates and directly dissolved in water in the oxidation-leaching step.

Reverting to the filtration of the slurry after the replacement reaction, it will be seen that iron sulfate, in amount equivalent to all the iron contained in the pregnant leach liquor coming to the replacement reaction, plus that iron dissolved from the ore concentrate added to the replacement reaction, is now in solution. The iron is in reduced form to a principal extent. This filtrate, then, comprises, so far as the present invention is concerned, the principal means of removing from the system iron sulfate. In addition, it removes from the system all the sulfuric acid which it is undesirable to convert to ammonium sulfate in the so-called pH adjustment step. This filtrate, ordinarily, may be passed to discard, without economic loss.

From the foregoing discussion, it will be seen that, by the practice of the process of the present invention, a leaching step which is self-sufficient, so far as sulfuric acid demand is concerned, has been provided. In addition, the ammonia consumption of the over-all process has been reduced to a very appreciable extent. Ammonia is no longer required in amount to neutralize all the acid produced during treatment, plus that formerly added as leaching agent. The ammonia consumption has been reduced to only that amount which is necessary to reduce the pH in converting all the nickel sulfate to nickel sulfate-ammonium sulfate double salt at a pH of 3-4. Any deficiency in ammonium sulfate to obtain the desired concentration is made up by recycling preformed sulfate from the separatory system. This is a very marked economic advantage over any previously-known circuit of this type. Its simplicity and effectiveness are even more extraordinary, when it is considered that sulfuric acid leaching, even sulfuric acid leaching with concomitant oxidation, has been practiced for many years, despite the obvious drawbacks to a solution system of that type. It is believed that from the foregoing discussion, the operation of the process, and its necessary modification by adjustment of the amounts handled in different flows to meet the different ore requirements, is readily apparent.

I claim:

1. A method of leaching a nickel-bearing ore containing at least one other non-ferrous metal value, iron sulfides and acid-insoluble gangue, which comprises the steps of: passing a quantity of nickel-bearing ore concentrate into an oxidation leaching system in which it is simultaneously subjected to: (a) oxidation in the presence of water and a gas selected from oxygen, oxygen-enriched air and air, (b) the action of a sufficient recycled amount of acid produced in the oxidation leaching step to provide a pH less than about 3.0 and (c) to a temperature of about 275-750° F., the water being sufficient in amount to prevent the acid content during reaction from exceeding 15%; removing oxidized slurry from the oxidation leaching system; filtering the said recovered slurry; discarding the solids residue; dividing the clarified filtrate into two portions;

treating one said portion with (a) a sufficient amount of ammonia to produce a pH of 4.0–6.8 in the presence of (b) sufficient ammonium sulfate after pH reduction to convert all the nickel content of said one portion to nickel sulfate-ammonium sulfate double salt in the presence of a solution concentrated with ammonium sulfate; collecting the residual resultant nickel-bearing precipitate; treating the remaining portion of said clarified filtrate at about 275–750° F. with a soluble reducing agent and additional amounts of ore concentrate having an iron and sulfur content equivalent to the non-ferrous metals content of said remaining portion of filtrate; continuing the treatment until replacement substantially ceases; collecting the solids content of the resultant slurry; passing the resultant clarified liquid from the system and feeding the collected solids to the oxidation leaching operation, together with water, additional ore concentrate and a portion of recycled acid produced in the oxidation leaching step.

2. A process according to claim 1 in which in the pH adjustment step, preformed ammonium sulfate is added to the solution.

3. A process according to claim 1 in which the reducing agent is a gas comprising at least one member of the group consisting of hydrogen, carbon monoxide and mixtures thereof.

4. In the leaching a nickel-bearing ore containing at least one other non-ferrous metal value, iron sulfide and acid-insoluble gangue, wherein the metal values are dissolved by an oxidation leaching system, the acid insoluble gangue is removed by filtration, the filtrate is adjusted in pH to 4.0–6.8 with ammonia in concentrated ammonium sulfate solution and the resultant nickel-bearing precipitate is removed: the improved method of eliminating iron and excess $SO_4^{--}$ ions which comprises, prior to said pH adjustment, dividing the flow of filtrate into two portions; passing one portion to said pH adjustment operation; treating the remaining portion in a reduction-replacement reaction at 275–750° F. with a soluble reducing agent and an amount of iron sulfide equivalent to the non-ferrous metals content of that portion of the leach liquor; continuing the treatment until replacement substantially ceases; collecting the solids content of the resultant slurry; returning the collected solids to said oxidation leaching operation; removing the residual filtrate from the system; and balancing the volume of two said portions of filtrate so that the acid content of the liquor passing to said pH adjustment step will not substantially exceed that amount which when neutralized with ammonia will yield sufficient ammonium sulfate to form nickel sulfate, ammonium sulfate double salt with all the nickel in solution; and provide in addition a concentrated solution of ammonium sulfate.

5. A process according to claim 4 in which previously-formed ammonium sulfate is added during said pH adjustment step, whereby the ammonia requirement is reduced.

PATRICK J. McGAULEY.

REFERENCES CITED

The following references are of record in the file of this patent:

UNITED STATES PATENTS

| Number | Name | Date |
|---|---|---|
| 930,967 | Jumau | Aug. 10, 1909 |
| 981,451 | McKechnie et al. | Jan. 10, 1911 |
| 1,039,861 | Wells | Oct. 1, 1912 |
| 1,461,918 | Laist | July 17, 1923 |
| 2,052,387 | Doran | Aug. 25, 1936 |